Figure 2:
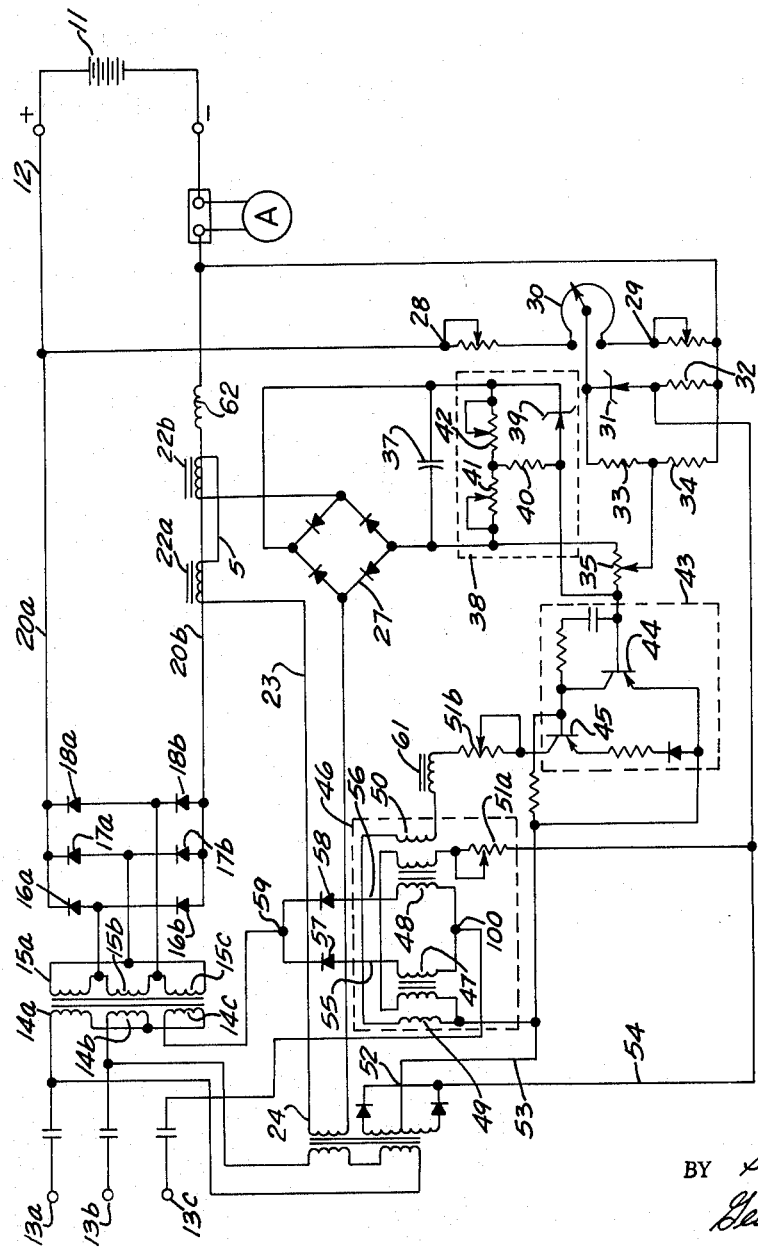

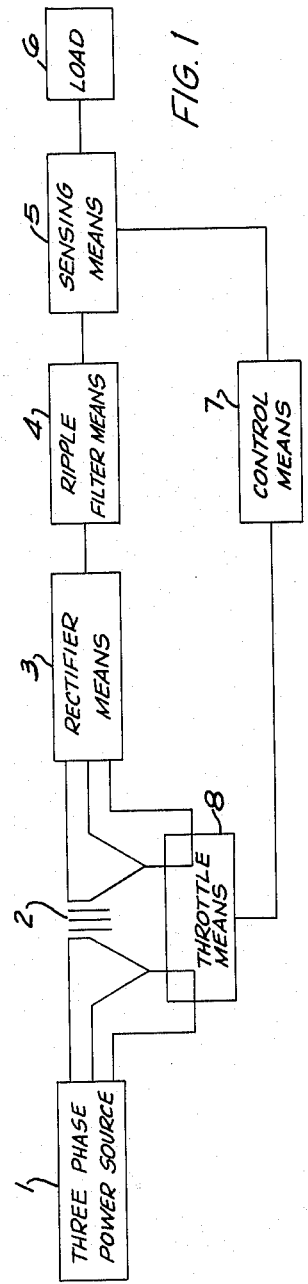
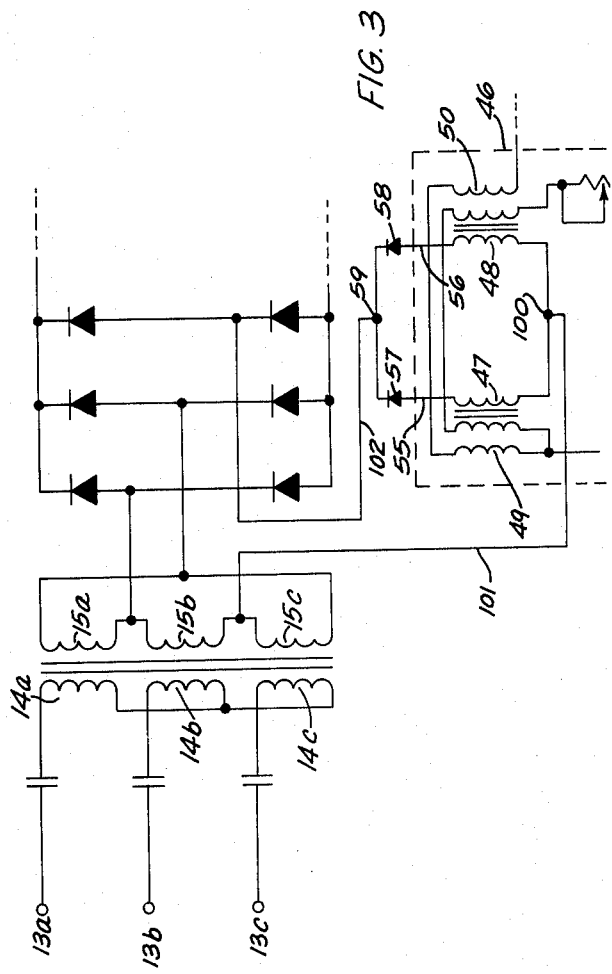
FRANK G. LOGAN
INVENTOR.
BY
ATTORNEYS

FRANK G. LOGAN
INVENTOR.

BY S. A. Giarratana
George B. Oujevolk
ATTORNEYS

United States Patent Office 3,258,675
Patented June 28, 1966

3,258,675
REGULATION OF CURRENT SUPPLIED BY THE RECTIFIED OUTPUT FROM A THREE PHASE A.-C. SOURCE
Frank G. Logan, Ridgewood, N.J., assignor to General Precision Inc., Little Falls, N.J., a corporation of Delaware
Filed June 4, 1962, Ser. No. 199,670
7 Claims. (Cl. 321—25)

The present invention relates to an arrangement for regulating the rectified D.-C. current supplied to a load from a transformer secondary side obtained out of a three phase A.-C. power source such as a power line, and, more particularly the present invention relates to a battery charger designed to charge lead-acid storage batteries.

In general, there are two basic systems for charging batteries, the constant current and the constant voltage system. In practice however, the systems actually used are modifications of these basic systems. Lead-acid storage batteries are preferably charged by some arrangement based upon the constant voltage system. A chart showing the theoretical charging rate of lead-acid batteries in accordance with the ampere-hour law was published by J. L. Woodbridge, "Storage-Battery Charging," Trans., Am. Inst. Elect. Engrs., 54, 516 (1935), and reproduced by George Wood Vinal in "Storage Batteries," fourth edition, John Wiley & Sons, Inc., 1955, page 245. The Woodbridge chart represents a graph of amperes and ampere-hours against time and shows a high initial current rate which drops with the charging time. The Vinal book, partly quoting the Woodbridge article states that "'As a result of numerous tests, it has been found that if the charging rate in amperes is kept below a value equal to the number of ampere-hours then out of the battery the conditions as to gassing and temperature will be met.' That is, if 200 ampere-hours have been discharged, the charging rate may begin at anything less than 200 amperes, but obviously this must be progressively reduced so that the charging current in amperes is always less than the number of ampere-hours the battery lacks to complete 100 percent charge. This is known as the ampere-hour law". In practice, a modification of the constant voltage system is used where the initial charge is at a fairly high but not the peak current for an initial period until the point is reached as indicated by the battery counter voltage to lower the charging current. Depending on the battery counter voltage then, the charging current value is gradually lowered until the end of the charge. This modified constant voltage system enables the battery to be charged at a considerable saving in equipment since it is thus not necessary to have the peak charging current theoretically indicated. It is however necessary to control the charging current in accordance with the battery condition as indicated by the battery counter voltage and, to this end, the battery charging unit will have some sensing means across the battery terminals sensing the voltage drop, and, feedback loop to the power source to gradually reduce the amperage supplied to the battery. When charging batteries from a three phase line, several schemes have been used to charge lead-acid batteries. To minimize the output current variation with input line changes, relatively large resistance components have been used in the rectified output side of the circuit. This results in an essentially constant current charging method which as already indicated is not the preferable way to charge lead-acid batteries, and besides is wasteful of power. To control the charging current as generally taught by the Vinal book and the Woodbridge chart, saturable reactors are used in each of the three-phase input or output transformer lines. The impedance is then controlled by a regulating scheme which minimizes the effect of line voltage changes and in addition, senses the battery counter voltage and provides a charging current appropriate to its value. The trouble with this arrangement is that it is bulky and the saturable reactors are expensive. Although many attempts may have been made to effectively control the value of the charging current supplied, in a simple, inexpensive and compact manner, none, as far as I am aware, were entirely successful when carried out into practice on an industrial scale.

It has now been discovered that an arrangement can be provided for regulating the rectified D.-C. current supplied by the transformer secondary side obtained from a three phase A.-C. power source such as a power line.

Therefore, an object of the present invention is to provide an arrangement for regulating the rectified D.-C. current supplied by the transformer secondary side obtained from a three phase A.-C. power source.

Another object of the present invention is to provide an arrangmeent for regulating the D.-C. current supplied to a lead-acid battery being charged by a battery charger coupled to a three-phase A.-C. source.

Still another object of the present invention is to provide a simple, inexpensive and compact arrangement for achieving the foregoing objectives.

With the foregoing and other objects in view, the invention resides in the novel arrangements and combinations of components hereinafter described, it being understood that changes in the precise embodiment of the invention herein disclosed may be made within the scope of what is claimed without departing from the spirit of the invention.

Other objects and advantages of the present invention will become readily apparent as the following detailed description of the invention unfolds, and when taken in conjunction with the accompanying drawing, in which:

FIGURE 1 is a block diagram of the inventive concept;
FIGURE 2 depicts a schematic diagram of a battery charger which embodies the inventive concept; and,
FIGURE 3 shows a schematic diagram of a portion of another wiring arrangement which can be substituted for the corresponding components illustrated in FIGURE 2.

Generally speaking, the present invention contemplates an improvement in the ripple filter and feedback loop of a transformer rectifier and includes a three leg power transformer 2 receiving its input from a three phase power source 1. The output from the transformer secondary is rectified by a rectifier means 3 to a rippling D.-C. current which is followed by a ripple filter stage 4 and dropped across a load 6 through a sensing means 5. Sensing means 5 in turn actuates control means 7 which will regulate throttle means 8 according to a preset pattern. Throttle means 8 acts as a valve on only one leg of the power transformer thus controlling the transformer output.

A practical embodiment of the foregoing arrangement is shown in FIG. 2 where a battery 11 is being charged by battery charger 12. Battery charger 12 is coupled to a three phase A.-C. line by coupling leads 13a, 13b, 13c. This three phase A.-C. input is rectified to a rippling D.-C. output across a power transformer rectifier arrangement including three primary legs, 14a, 14b, 14c, three secondary legs, 15a, 15b, 15c and three rectifier pairs, 16a and 16b; 17a and 17b; 18a and 18b. Each pair is oriented so as to channel the current path in the same direction; and the output of each secondary leg 15a, 15b and 15c is fed to a junction point between each pair of rectifiers, all pairs being oriented in the same direction. The output from each pair therefore is a pulsating D.-C. current and the output from the three pairs is a rippling D.-C. current. This D.-C. output is dropped by suitable leads 20a and 20b across battery 11, the charging current flowing through the battery being in the direction opposite to that of the battery discharge current. The amount of current to be fed the battery is determined by the battery counter volts. The current supplied is determined by charts supplied by battery manufacturers. Thus, the Gould National Batteries, Inc. "Battery Users Training Manual for Lead-Acid Motive Power Batteries," copyright 1958, on page 26 supplies a volt-ampere characteristic curve. Working from such a curve, a modified constant voltage arrangement can be derived to supply for a particular battery an initial charge of about 185 amperes for about two hours and a gradually decreasing charge for about eight hours. The actual amperage supplied is determined by the battery counter volts.

To sense the battery counter voltage there is provided in lead 20b to the battery, a sensing means 5, comprising a pair of coils 22a and 22b wound around lead 20b in opposed phase relationship. These coils are fed an A.-C. excitation current by excitation leads 23 from excitation transformer 24 coupled to the power line. The output from coils 22a and 22b is across a full wave D.-C. rectifier 27 illustrated as a four diode bridge. As long as there is no voltage change in lead 20b, there is no current output across the full wave D.-C. rectifier 27. The battery counter voltage is reflected in a voltage divider circuit shown as resistors 28 and 29 and potentiometer 30. The potentiometer 30 is adjustable for each battery and is in series between the resistors. The output of the wiper arm of potentiometer 30 is in series with first zener diode 31 and zener bias resistor 32 which in turn are in parallel with resistor 29. These form part of control means 7. The zener diode will supply a changing current corresponding to a changing input for a large portion of its operational characteristic and the combination of zener diode 31 and zener bias resistor 32 determines the slope of the output. The constant current portion of the charging cycle is determined by bias resistors 33 and 34 in parallel with the zener diode 31 and potentiometer 35 coupled in series between the midpoint of bias resistors 33 and 34 and full wave D.-C. rectifier 27.

The output of full wave D.-C. rectifier 27 includes a filter capacitor 37 in parallel across the output and a control stage 38 including a second zener diode 39 defining the current limit with variable bias resistors 40, 41 and 42. In the control stage 38, the variable bias resistors 42 and 43 are in parallel with filter capacitor 37 and resistor 40 coupled to the midpoint of variable bias resistors 42 and 43 and to second zener diode 39. The output from the full wave rectifier as controlled by second zener diode 39 for constant current value set by potentiometer 35 and at the slope set by first zener diode 31 actuates amplifier stage 43 having a voltage stage transistor 44 and a power stage transistor 45. Amplifier 43 in turn controls saturable reactor throttle means 46.

Saturable reactor throttle means 46 throttles only one leg, e.g., leg 14c of the three phase A.-C. input and includes saturable magnetic amplifiers 47 and 48, control coils 49 and 50 for each magnetic amplifier and bias resistors 51a and 51b in series with each of the control coils. The saturable reactor stage is also supplied an excitation from the power line by a transformer 52 across leads 53 and 54. The output from each magnetic amplifier of the saturable reactor 46 is to leads 55 and 56 across rectifiers 57 and 58 to a junction point 59 which controls the input to one leg 14c of the input primary transformer. To complete the circuit, resistor 60 to bias the base of transistor 45 of the power stage and reactor coil 61 to cancel harmonics are provided.

Finally the circuit includes filter choke 62 of ripple filter stage 4, for the proper regulation of the rectified output. Filter choke 62 is in output lead 20b in series with the load or battery 11 being charged. The average D.-C. voltage derived from a one phase rectifier is 0.9 volt D.-C. for each 1 volt A.-C. applied to it. A three-phase full wave bridge rectifier delivers 1.34 volts D.-C. for each 1 volt A.-C. applied to it. Therefore, disregarding for the moment the effect of choke 62, the output voltage of the rectifier may be changed in the ratio of 0.9 to 1.34. This may be satisfactory for some applications, however, with filter choke 62 of appropriate inductance inserted in the D.-C. output circuit of the rectifier, a significant increase in the range of the D.-C. voltage is obtained in switching from the one phase to the three phase mode of operation. This comes about because of the peak ripple voltage of a one phase rectifier is 1.57 times the average D.-C. value, the peak ripple voltage of the rectifier operating in the three phase mode is about 5%, thus, the ratio for a three phase full wave bridge is only 1.05 to 1. The effect then of the filter choke 62 in the output D.-C. circuit is to bring the ripple voltage down to some approximation of the average value when the rectifier is operating essentially one phase.

Although the illustration in FIGURE 2 shows the control of one leg of the three phase supply on the primary side of the power transformer, this control may just as well be on the secondary side as shown in FIGURE 3. Here, the third leg of the primary 14c is coupled to the power line coupling lead 13c and saturable reactor 46 is in series with the output from the third leg 15c of the transformer secondary is to input junction point 100 of the saturable reactor across lead 101 and the output from the saturable reactor 46 from junction point 59 is across lead line 102 to the midpoint between rectifier pairs 18a and 18b. Since the rest of the circuit for the embodiment of FIGURE 3 is substantially the same as for FIGURE 2, it is not shown in the drawing.

It is to be observed therefore that the present invention provides for an arrangement for regulating the rectified D.-C. output supplied in a series circuit to a load by a three phase transformer rectifier which obtains its input from a three phase A.-C. power source and includes rectifier means, and comprises in combination; sensing means disposed between said load and rectifier means sensing the changing voltage caused by said load including a pair of coils wound in phase opposition in said series circuit and an A.-C. excitation circuit having excitation leads between said coils and said power source; a feedback loop between said sensing means and one leg of said three leg transformer, either on the primary side or on the secondary side, said feedback loop including a full wave rectifier coupled to the output from said coils and an amplifier stage fed by the output of said full wave rectifier; throttle means in said feedback loop acting as a valve between said one leg and said power source responsive to said amplifier stage including saturable magnetic reactor means; and, control means in said feedback loop, including a first zener diode stage in parallel with said load reflecting said load condition, and a second zener diode stage in parallel with said full wave rectifier output defining the initial conditions for said throttle means to start its response, said first and second zener diode stages supplying a control signal to said amplifier stage. The ripple filter stage includes a ripple filter choke in said series circuit to said load.

It will be apparent to those skilled in the art, that our present invention is not limited to the specific details described above and shown in the drawing, and that various modifications are possible in carrying out the features of the invention and the operation and method of support, mounting and utilization thereof, without departing from the spirit and scope of the appended claims.

In the claims:

1. An arrangement for regulating the rectified D.-C. output supplied to a load by a three phase transformer rectifier having rectifier means and a three leg transformer including a secondary and primary which obtains its input from a three phase A.-C. power source, comprising in combination; sensing means disposed between said load and rectifier means connected to said secondary sensing a changing voltage caused by said load; a feedback loop between said sensing means and one leg of said three leg transformer; throttle means in said feedback loop and coupled to said one leg responsive to said feedback loop acting as a valve between said one leg and said power source; and, control means in said feedback loop coupled to said load and sensing means which, in accordance with the input signal from said load and sensing means will regulate said throttle means according to a preset pattern.

2. An arrangement as claimed in claim 1 including a ripple filter stage between said rectifier means and said load designed to accommodate the peak conditions when said one leg is completely opened and completely throttled.

3. An arrangement as claimed in claim 2, said throttle means including a magnetic amplifier stage controlling said one leg.

4. An arrangement for regulating the rectified D.-C. output supplied in series circuit to a load by a three phase transformer rectifier having rectifier means and a three leg transformer which obtains its input from a three phase A.-C. power source, comprising in combination; sensing means disposed between said load and rectifier means sensing a changing voltage caused by said load including a pair of coils wound in phase opposition in said series circuit and an A.-C. excitation circuit between said coils and said power source; a feedback loop between said sensing means and one leg of said three leg transformer including a full wave rectifier coupled to the output from said coils and an amplifier stage fed by the output of said full wave rectifier; throttle means in said feedback loop acting as a valve between said one leg and said power source responsive to said amplifier stage, including saturable magnetic reactor means; and, control means in said feedback loop, including a first zener diode stage in parallel with said load reflecting said load condition and a second zener diode stage in parallel with said full wave rectifier output defining the initial conditions for said throttle means to start its response, said first and second zener diode stages supply a control signal to said amplifier stage.

5. An arrangement as claimed in claim 4 including a ripple filter choke in said series circuit to said load.

6. An arrangement as claimed in claim 5, said one leg being on the primary side of said three leg transformer.

7. An arrangement as claimed in claim 5, said one leg being on the secondary side of said three leg transformer.

References Cited by the Examiner

UNITED STATES PATENTS

| | | | |
|---|---|---|---|
| 2,617,973 | 11/1952 | Wolff et al. | |
| 2,719,257 | 9/1955 | Sargeant et al. | 321—25 X |
| 2,730,668 | 1/1956 | Edelman | 321—18 |
| 2,810,877 | 10/1957 | Silver | 321—25 X |
| 2,945,172 | 7/1960 | Bixby | 321—25 X |
| 3,042,848 | 7/1962 | Muchnik et al. | 321—25 X |
| 3,199,016 | 8/1965 | Greene et al. | 321—25 |

JOHN F. COUCH, *Primary Examiner.*

LLOYD McCOLLUM, *Examiner.*

A. J. GAJARSA, M. WACHTELL, *Assistant Examiners.*